(12) United States Patent
Sohn et al.

(10) Patent No.: US 9,362,552 B2
(45) Date of Patent: Jun. 7, 2016

(54) LITHIUM ION BATTERY ELECTRODE MATERIALS AND METHODS OF MAKING THE SAME

(75) Inventors: Hiesang Sohn, Los Angeles, CA (US); Yunfeng Lu, Los Angeles, CA (US); Mei Cai, Bloomfield Hills, MI (US); Qiangfeng Xiao, Los Angeles, CA (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 685 days.

(21) Appl. No.: 13/486,547

(22) Filed: Jun. 1, 2012

(65) Prior Publication Data
US 2013/0323595 A1 Dec. 5, 2013

(51) Int. Cl.
| | | |
|---|---|---|
| *H01M 4/133* | (2010.01) | |
| *H01M 4/1393* | (2010.01) | |
| *H01M 4/131* | (2010.01) | |
| *H01M 4/134* | (2010.01) | |
| *H01M 4/136* | (2010.01) | |
| *H01M 4/04* | (2006.01) | |
| *H01M 4/1395* | (2010.01) | |
| *H01M 4/36* | (2006.01) | |
| *H01M 2/16* | (2006.01) | |
| *H01M 10/052* | (2010.01) | |

(52) U.S. Cl.
CPC .............. *H01M 4/134* (2013.01); *H01M 4/0428* (2013.01); *H01M 4/1395* (2013.01); *H01M 4/366* (2013.01); *H01M 2/16* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2009/0186267 A1 | 7/2009 | Tiegs | |
| 2009/0239151 A1* | 9/2009 | Nakanishi et al. | 429/231.95 |
| 2010/0143798 A1* | 6/2010 | Zhamu et al. | 429/212 |
| 2010/0297502 A1* | 11/2010 | Zhu et al. | 429/231.8 |

OTHER PUBLICATIONS

U.S. Appl. No. 13/100,579, May 2011, Amine et al.*
http://www.graphenea.com/pages/cvd-graphene#.VUI2M_IdURM.*

* cited by examiner

*Primary Examiner* — Patrick Ryan
*Assistant Examiner* — Christopher Domone
(74) *Attorney, Agent, or Firm* — Dierker & Kavanaugh, P.C.

(57) ABSTRACT

An example of a lithium ion battery electrode material includes a substrate, and a substantially graphitic carbon layer completely encapsulating the substrate. The substantially graphitic carbon layer is free of voids. Methods for making electrode materials are also disclosed herein.

17 Claims, 4 Drawing Sheets

US 9,362,552 B2

LITHIUM ION BATTERY ELECTRODE MATERIALS AND METHODS OF MAKING THE SAME

TECHNICAL FIELD

The present disclosure relates generally to lithium ion battery electrode materials, and methods of making the same.

BACKGROUND

Secondary, or rechargeable, lithium ion batteries are often used in many stationary and portable devices such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium ion batteries to undergo repeated power cycling over their useful lifetimes makes them an attractive and dependable power source.

SUMMARY

A lithium ion battery electrode material is disclosed herein. The electrode material includes a substrate and a substantially graphitic carbon layer completely encapsulating the substrate. The substantially graphitic carbon layer is free of voids.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
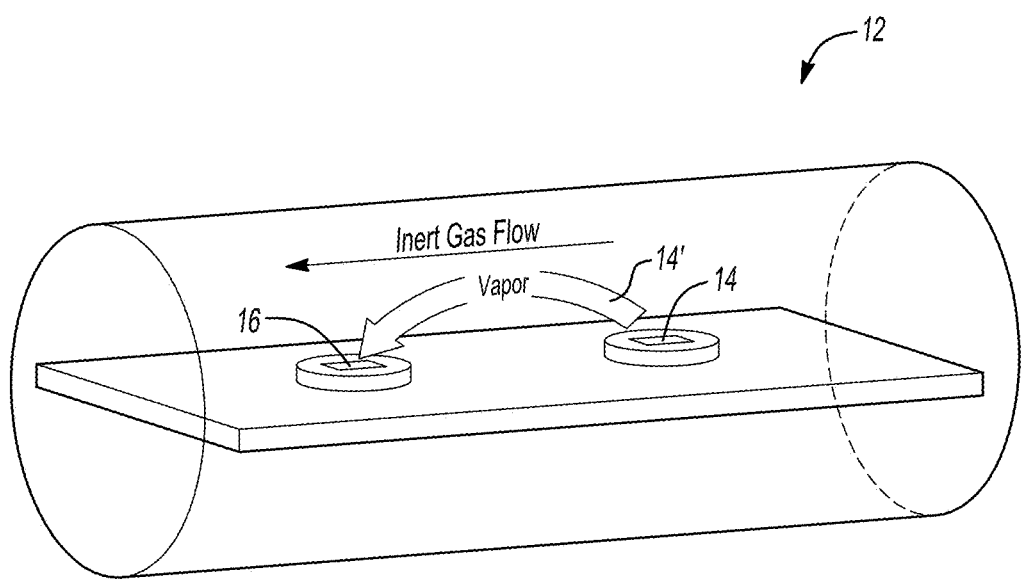
FIG. 1 is a semi-schematic diagram of an example of a method for forming an example of a lithium ion battery electrode material.

Lithium ion batteries are used in a variety of electronic devices, ranging from vehicles (e.g., hybrid electric vehicles (HEV), battery electric vehicles (BEV), plug-in HEVs, or extended-range electric vehicles (EREV)) to portable electronics (such as laptop computers, cellular/smart phones, etc.). A lithium ion battery generally operates by reversibly passing lithium ions between a negative electrode (sometimes called the anode, as the negative electrode is the anode of the cell on discharge) and a positive electrode (sometimes called the cathode, as the positive electrode is the cathode of the cell on discharge). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related transport of lithium ions.

As will be described further hereinbelow, the negative electrode may include a lithium intercalation host material, and the positive electrode may include a lithium-based active material that can store lithium metal at a lower energy state than the intercalation host material of the negative electrode. The electrolyte solution may contain a lithium salt dissolved in a non-aqueous solvent.

A lithium ion battery, or a plurality of lithium ion batteries that are connected in series or in parallel, can be utilized to reversibly supply power to an associated load device.

During a single power cycle, beginning with battery discharge, the negative electrode of the lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium is then split into lithium ions and electrons. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the intercalated lithium present in the positive electrode to produce lithium ions and electrons. The lithium ions are carried back through the separator by the electrolyte solution and the electrons are driven back through the external circuit, both towards the negative electrode. The lithium ions and electrons are ultimately reunited at the negative electrode thus replenishing it with intercalated lithium for future battery discharge.

Many techniques have been utilized to form electrode materials. Some of these techniques are limited, for example, by materials and/or equipment that can be used and/or by particular operating conditions (such as low pressure). The methods disclosed herein are versatile methods that can form a variety of electrode materials. As examples, the methods may be used to form a continuous substantially graphitic carbon layer on a substrate or to form a porous carbon layer on a substrate.

Referring now to FIG. 1, a schematic illustration of one example of the method is depicted. In this example, a heating device 12 is utilized to carry out the method. Examples of suitable heating devices 12 include fluidized beds, conventional heating instruments, such as a furnace or an oven, or dielectric heating instruments, such as an induction heater, an electronic heating mechanism (e.g., a diathermy mechanism), an RF heating mechanism, or a high-frequency heating mechanism. A tube furnace is shown as the example heating device 12 in FIG. 1.

A carbon precursor 14 is inserted into the heating device 12 and is heated to a temperature that is above the boiling point of the selected carbon precursor 14. Suitable carbon precursors 14 include, for example, aromatic hydrocarbons or aromatic functional groups containing silanes. Examples of aromatic hydrocarbons include benzene, naphthalene, toluene, or xylene. Examples of suitable aromatic functional groups containing silanes include Diphenylsilanediol (DPSD), Diphenylsilane, Triethoxy(1-phenylethenyl)silane, Trimethyl(phenoxy)silane, Trimethyl(phenyl)silane, Diphenyl(silane-$d_2$), or Triphenyl(vinyl)silane). The boiling points of these carbon precursors 14 range from about 80° C. to about 365° C. It is to be understood that the temperature selected to form the carbon precursor vapor 14' will depend, at least in part, upon the carbon precursor 14 that is utilized and the type (i.e., porous or solid) of carbon coating to be formed. In some instances, the temperature selected may be well above the boiling point of the selected carbon precursor 14'. For example, the temperature selected to form the carbon precursor vapor 14' may range from about 650° C. to about 900° C. In some instances, the temperature selected may be even higher than 900° C. Temperatures that are well above the boiling point of the selected carbon precursor 14 generally result in a coating layer that has fewer or no voids and a more graphitic structure.

At the selected elevated temperature, the carbon precursor 14 evaporates to form a carbon precursor vapor 14'. A gas flow is utilized to supply the carbon precursor vapor 14' to a substrate 16 that has been positioned downstream of the carbon precursor 14 in the direction of the gas flow. Suitable carrier gases include inert gases, such as nitrogen gas ($N_2$), argon (Ar), helium (He), etc. In some examples, other gases, such as ammonia ($NH_3$) or hydrogen gas ($H_2$), may be co-employed with the inert gas. For example, a mixture of $N_2$ and $H_2$ may be used as the gas flow. In addition to functioning as a carrier gas, this mixture may facilitate reduction of the selected substrate 16. In this example, the mixture of $N_2$ and $H_2$ may include a ratio of $N_2$:$H_2$ of 9:1. In some other examples, other vapors, such as HCl, may be co-employed with the inert gas. In still some other example, gaseous or vaporized hydrocarbons may be co-employed with the inert gas. Additional gases and vapors aside from the inert gas may affect the reaction that takes place. It is to be understood that these additional gases and vapors are selected so as to not deleteriously affect the formation of a carbon layer (not shown in FIG. 1) on the substrate 16. Yet another suitable carrier gas includes $CO_2$.

In the example method shown in FIG. 1, at least some of the carbon precursor vapor 14' deposits on the substrate 16 to form the carbon layer thereon. Examples of the carbon layer that may be formed via this example of the method are shown in FIGS. 2A, 2B, 3A, and 3B, and will be discussed further in reference to those figures.

The substrate 16 may be formed of a single element or of a composite material including multiple elements. The composite material substrates may be synthesized via any suitable synthetic process, such as the aerosol assisted process shown in FIG. 4. The substrate 16 may be formed of any lithium intercalation host material (e.g., anode materials, such as transition metals (porous or solid), Si or Ge (with or without an outer oxide layer), $Fe_3O_4$, $SnO_2$, and $TiO_2$) or any lithium-based active material (e.g., cathode materials, such as lithium transition metal oxides and lithium transition metal phosphates). Suitable lithium transition metal oxides include layered oxides (such as $LiMO_2$, where M is chosen from a transition metal such as, e.g., Co, Ni, Mn, Cu, Fe, Mo, Cr, V, Ti, Nb, Sn, and the like, and combinations thereof) or spinel oxides (such as $LiMn_2O_4$), and suitable lithium transition metal phosphates may have the chemical formula $LiMPO_4$, where M is chosen from a transition metal such as, e.g., Co, Ni, Mn, Cu, Fe, Mo, Cr, V, Ti, Nb, Sn, and the like, and combinations thereof. Another example of a suitable lithium transition metal oxide is $Li_2MSiO_4$, where M is chosen from Co, Ni, Mn, Cu, Fe, Mo, Cr, V, Ti, Nb, Sn, and the like, and combinations thereof.

The substrate 16 may be in any form, such as a powder, particles, a film, etc. In some instances, the substrate 16 is in the form of a sphere, or a cylinder, or any other desirable shape. As an example, a single sphere may have a diameter ranging from about 10 nm to about 1 μm. In an example, the substrate is a solid, non-porous material. In another example, the substrate 16 is a porous material (i.e., has a single pore or multiple pores formed therein). Porous substrates may be purchased, fabricated using a pore former (not shown), fabricated using another suitable process (such as anodization or stain etching), or fabricated using the aerosol process described in reference to FIG. 4.

In examples in which pore former(s) is/are utilized, the pore former(s) is/are sacrificial materials that are added to the substrate during formation, and then are later removed. As an example, zinc may be used as a pore former in silicon. After the desired silicon substrate is formed, the zinc may be etched away using an etchant that is selective toward zinc and that will not deleteriously affect the silicon. In other examples, pore former(s) may be removed via a burning process that is controlled so as to not over oxidize the selected substrate material. Other examples of suitable pore formers include structure directing agents (e.g., surfactants, polymers, aliphatic carbons, etc.) or soft or hard templates. Soft template pore formers include emulsions, polymer beads, and micelles that can be degraded during the formation of the substrate. Hard templates include inorganic salts (e.g., NaCl) or silica that can be removed from the substrate with a dissolving solution or solvent.

In an example, a single pore former that extends the length of a cylindrical mold may be positioned at the center of the diameter of the cylindrical mold. The substrate material (e.g., in liquid or molten form) may be added between the pore former and the cylindrical mold. Upon cooling, the substrate 16 having the pore former therein is formed in the shape of the cylindrical mold. The pore former may be then removed by exposure to a solvent that dissolves the pore former and does not deleteriously affect the substrate 16. In this example, a pore is formed in the center of the diameter of the substrate 16 along the longitudinal axis of the substrate 16. When the carbon layer is formed, the ends of the pore will be covered by the layer, however, the pore will remain hollow throughout the substrate 16. It is to be understood that multiple pore formers may be used in a cylindrical mold in a similar fashion.

In another example, multiple pore formers may be stacked within a spherical mold so that voids exist between the pore formers. In an example, at least some of the multiple pore formers are of different sizes and/or different types (e.g., hard and soft templates). The use of different sizes and/or types may be desirable to form a hierarchal pore structure (i.e., a gradient of pores). The substrate material (e.g., in liquid or molten form) may be added to the spherical mold so that it flows into the voids. Upon cooling, the substrate 16 having the pore formers therein is formed in the shape of the spherical mold. The pore formers may be then removed by exposure to a solvent that dissolves the pore formers and does not deleteriously affect the substrate 16. In this example, multiple interior and exterior pores are formed throughout the substrate 16. When the carbon layer is formed, the exterior of the pores will be covered by the layer, however, at least some of the pores will remain hollow within the substrate 16. It is to be understood that a single pore former may be used in a spherical mold in a similar fashion.

The method shown in FIG. 1 may be used to form a substantially graphitic carbon layer or a porous carbon layer. By altering process conditions, such as the carbon precursor 14, carrier gas, flow rate, and/or the processing temperature, the method may be altered to generate the substantially graphitic carbon layer or the porous carbon layer. As such, the method(s) disclosed herein enable control over the morphology and the crystallinity of the resulting carbon layer. High temperatures (e.g., 800° C.), aromatic precursors, and inert carrier gas ($N_2$, Ar, etc.) favor the formation of the substantially graphitic carbon layer. When porous substrates 16 are used, the deposition thickness of the layer may be controlled by precursor size, precursor concentration, and/or flow rate. If the carrier gas is $CO_2$, the porous carbon layer may be formed on either a solid or a porous substrate 16, at least in part because the $CO_2$ can serve as an activation agent to produce micropores in the layer.

In an example, temperatures at or above 800° C. may be used to generate the substantially graphitic carbon layer (which is continuous and free of voids). Graphitic layers form by the SP2 ordered arrangement of decomposed hydrocarbon molecules that adsorb onto the surface of the substrate 16 at the high temperatures. Temperatures below 800° C., but above the boiling temperature of the selected carbon precursor 14, may be used to generate the porous carbon layer (which is more disordered than graphitic carbon). A porous and graphitic carbon layer may be generated by combining the temperature conditions into a single process (e.g., varying the temperature above and below 800° C., while keeping the temperature above the boiling point of the selected carbon precursor 14).

As noted above, the substantially graphitic carbon layer is a continuous layer that is free of voids (i.e., pores, cracks, breaks, etc.). The substantially graphitic carbon layer includes stacked layers of graphene having a length of the basal plane (i.e., interspacing) ranging from about 0.335 nm to about 0.671 nm. The interspacing of the substantially graphitic carbon layer renders it difficult for molecules larger than the spacing to penetrate the layer. Smaller molecules are still able to penetrate the layer. As such, the substantially graphitic carbon layer is permeable to lithium ions and electrons, while being a barrier to other species, such as solvent molecules that could otherwise degrade the underlying substrate 16. The substantially graphitic carbon layer may also be permeable to other smaller molecules, such as metal cations and some anions, but is generally a barrier to larger species that lead to degradation of the underlying substrate 16. Examples of the substantially graphitic carbon layers are shown in FIGS. 2A through 3B.

Figure 2A:
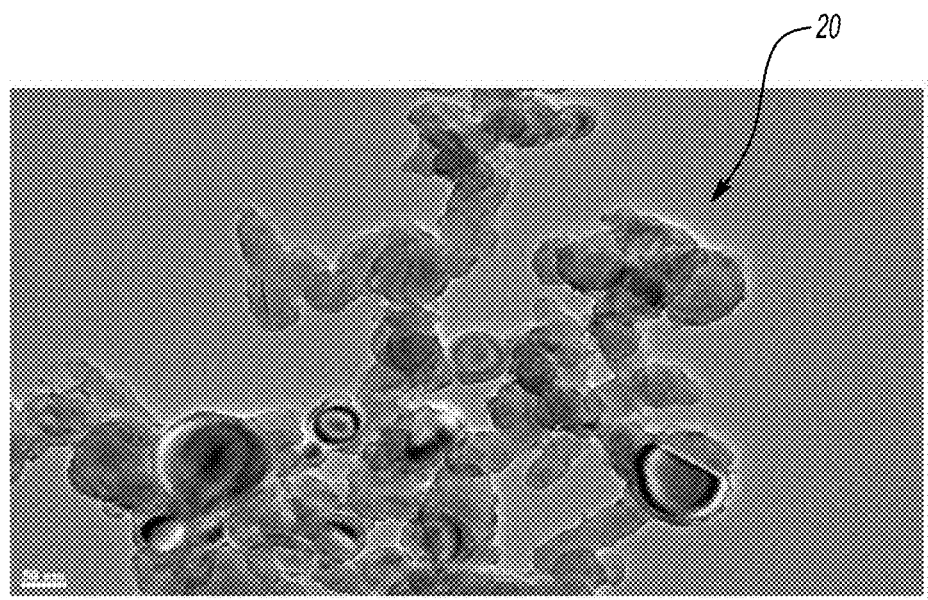
FIG. 2A is a transmission electron micrograph (TEM) image of an example of the lithium ion battery electrode material formed from the example method of FIG. 1, where the lithium ion battery electrode material is in the form of spheres.
Figure 2B:
FIG. 2B is a TEM image of an edge of one of the lithium ion battery electrode material spheres illustrating an example of a substantially graphitic carbon layer completely encapsulating a silicon substrate.

FIG. 2A illustrates an anode material 20 in the form of nanoparticles that were formed via the method described in reference to FIG. 1. FIG. 2B is an enlarged view of the surface of one of the nanoparticles. The anode material 20 includes a silicon nanoparticle substrate 16 coated with the substantially graphitic carbon layer 18. These particles were formed using silicon nanoparticles as the substrate and toluene as the carbon precursor 14. The materials were placed in separate containers in a tube furnace, and were exposed to a temperature of 900° C. for more than 30 minutes. An inert gas flow of argon delivered the toluene vapors in the direction of the silicon nanoparticles, and the substantially graphitic carbon layer 18 formed on the surface of each of the silicon nanoparticles. The TEM image in FIG. 2B clearly illustrates the silicon core and the substantially graphitic carbon shell formed thereon. The interface between the materials is continuous, and the substantially graphitic carbon layer is free of voids.

Figure 3A:
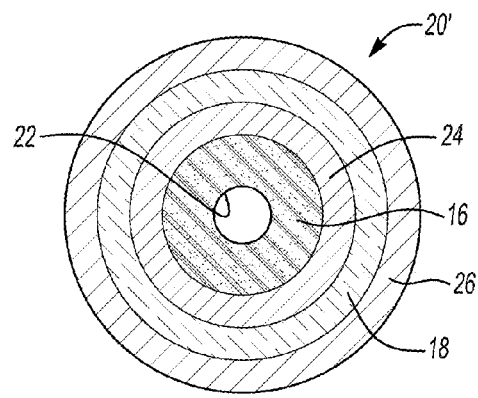
FIG. 3A is a cross-sectional view of an example of the lithium ion battery electrode material formed from the example method of FIG. 1.
Figure 3B:
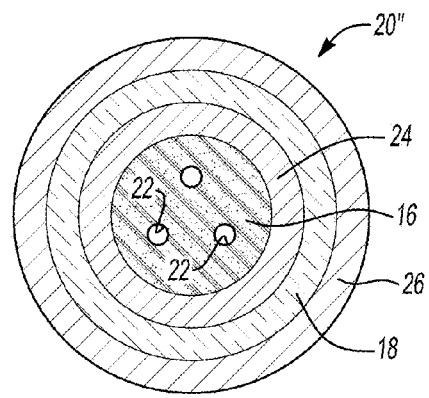
FIG. 3B is a cross-sectional view of another example of the lithium ion battery electrode material formed from the example method of FIG. 1.

FIGS. 3A and 3B are cross-sectional view of two other examples of anode materials 20', 20" that may be formed via the method shown in FIG. 1.

Figure 5:
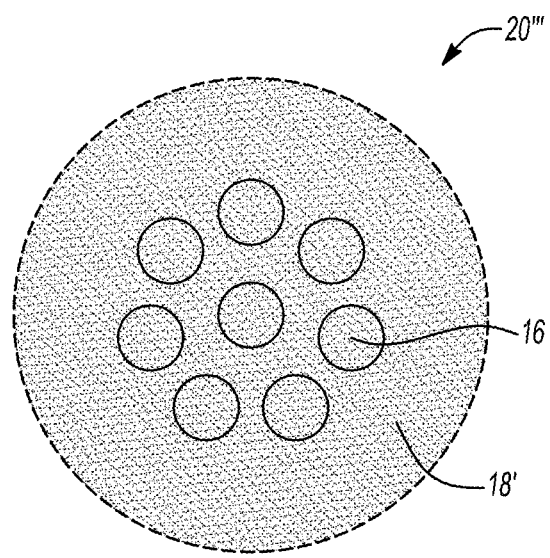
FIG. 5 is a schematic view of an example of a lithium ion battery electrode material formed from the example method of FIG. 4.

FIG. 3A illustrates a silicon substrate 16 having a single pore 22 formed therein, while FIG. 3B illustrates a silicon substrate 16 having multiple pores 22 formed therein. In an example, the pore(s) 22 may be formed using the pore former(s) previously described. In another example, the pore(s) 22 may be formed via etching or another suitable process. The pore(s) 22 also allow for the expansion of the silicon substrate 16 during lithium intercalation. This is believed to reduce stress on the electrode material during battery charge and discharge. It is to be understood that other mechanisms may be used to reduce stress in the examples disclosed herein. As an example, the porous carbon layer (shown as 18' in FIG. 5) is spongy, and thus allows the substrate 16 to expand during lithium intercalation. In another example, the pores may be filled with a soft material (e.g., a binder or polymer) that allows the substrate 16 to expand to lithium intercalation.

In each example, the silicon substrate 16 has an oxide layer 24 (e.g., silicon dioxide) formed thereon. The oxide layer may be a native oxide layer that is present on the surface of the substrate 16. It is noted that in some instances (e.g., as shown in FIG. 2B), the oxide layer 24 may not be present.

The substantially graphitic carbon layer 18 is formed on the oxide layer 24 using the method described in reference to FIG. 1. It is to be understood that the substantially graphitic carbon layer 18 completely covers the oxide layer 24 and the silicon substrate 16, and thus covers the ends of the pore(s) 22. As discussed above, a large portion of the pore(s) 22 remain hollow.

These examples of the anode materials 20' and 20" also include an artificial solid electrolyte interphase (SEI) 26 covering the substantially graphitic carbon layer 18. The SEI layer may form on the substantially graphitic carbon layer 18 over time as the materials 20', 20" are used in a lithium ion battery. For example, the SEI layer forms by the decomposition of the electrolyte due to the lowering of the voltage during the charge-discharge process. In an example, the artificial solid electrolyte interphase is aluminum oxide ($Al_2O_3$), aluminum fluoride ($AlF_3$), or mixed aluminum oxyfluorides (e.g., $AlF_xO_y$, where $0<x<3$ and $0<y<3$). In other instances, the solid electrolyte interphase is molybdenum dioxide ($MoO_2$) or titanium dioxide ($TiO_2$), each of which has some Coulombic capacity.

Figure 4:
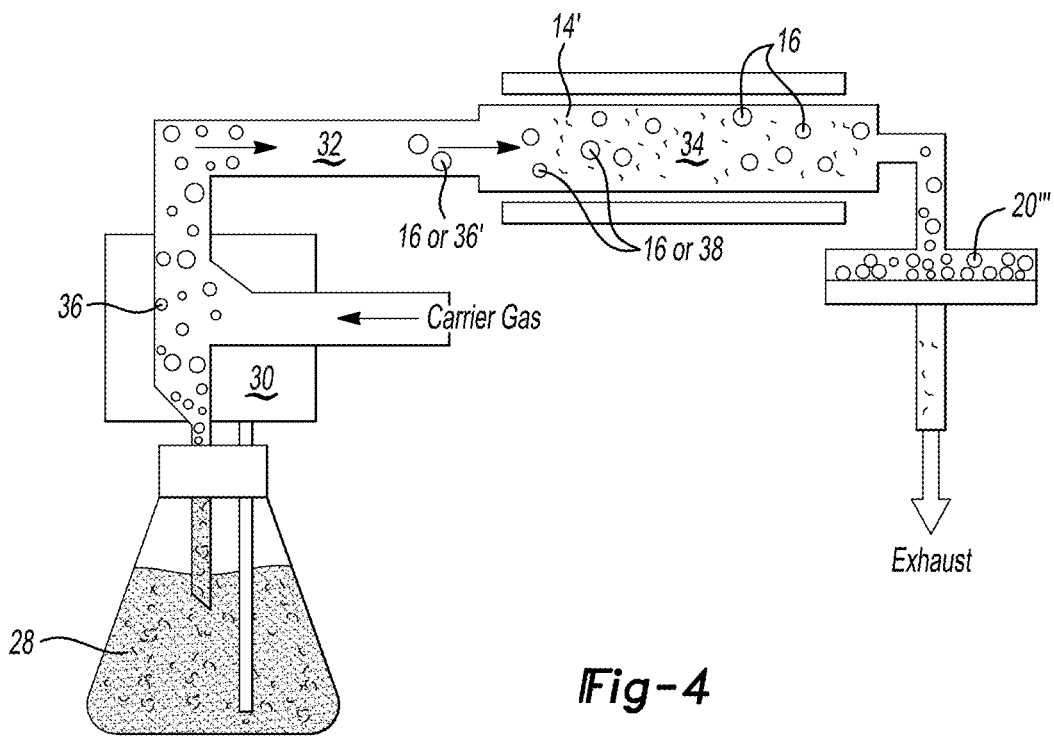
FIG. 4 is a semi-schematic diagram of another example of a method for forming another example of a lithium ion battery electrode material.

Referring now to FIG. 4, another example of the method is schematically shown. This example utilizes the vapor deposition process previously described, but also involves an aerosol-assisted process. This method may be utilized to form any example of the anode material (20, 20', 20") or cathode material disclosed herein, which may include any of the previously described substrate materials and carbon layers.

In this example, a precursor solution 28 includes a substrate material or a substrate precursor material in a liquid carrier. An example of a suitable substrate material includes silicon nanoparticles, or any of the other substrate materials listed herein. Examples of substrate precursor materials include metal oleates or metal salt-organic ligand complexes. An example of an iron oxide substrate precursor material is iron oleate. The liquid carrier may by any suitable hydrocarbon, such as toluene. Other suitable liquid carriers for the precursor solution 28 include water, alcohols, and other non-hydrocarbon solvents.

The precursor solution 28 is exposed to an atomization process in an atomizer 30. The atomization process utilizes an inert carrier gas. During this process, aerosol droplets 36 of the precursor solution 28 are generated and carried (by the inert carrier gas) through a drying zone 32 and a heating zone 34.

The drying zone 32 operates to evaporate the liquid carrier, thereby forming substrate particles or substrate precursor particles 36'. It is to be understood that when substrate material is used in the precursor solution 28, substrate particles 16 will form upon liquid carrier removal, and when substrate precursor material is used in the precursor solution 28, substrate precursor particles 36' will form upon liquid carrier removal.

In the heating zone 34, the substrate particles 16 or the substrate precursor particles 36' are exposed to heat and to the carbon precursor 14 (not shown). When substrate precursor particles 36' are introduced into the heating zone 34, these particles 36' may first convert to a pre-substrate composite material 38 (e.g., when initially exposed to heat in the heating zone 34) prior to fully converting to the substrate 16. It is believed that water resulting from the self-condensation reactions of the carbon precursor 14 may further cause the conversion of the pre-substrate composite material 38 to the substrate 16. For example, the self-condensation reactions may cause further oxidation of the pre-substrate composite material 38. In an example, a precursor solution 28 of iron oleate in toluene is utilized to form the droplets 36. The toluene is evaporated from the droplets 36 in the drying zone 32, leaving iron oleate particles 36'. In the heating zone 34, the iron oleate particles 36' first become pre-substrate composite particles 38 including carbon and nanocrystals of Fe and $FeO_x$. With additional exposure to heating in the heating zone 34, the pre-substrate composite particles 38 fully convert to the substrate 16, such as $Fe_3O_4$. In some instances, it is believed that water resulting from the self-condensation reactions of the carbon precursor 14 (e.g., DPSD) further oxidize the Fe—$FeO_x$ nanocrystals into $Fe_3O_4$. The process structurally stabilizes the $Fe_3O_4$ particles (or other substrate 16) with the carbon layer 18 or 18'.

As noted above, in the heating zone 34, the substrate 16 is exposed to the carbon precursor 14 (not shown) and to a temperature that is above the boiling point of the selected carbon precursor 14. The elevated temperature in the heating zone 34 causes the carbon precursor 14 to evaporate to form the vapor 14', which then deposits on the surfaces of the substrate 16 to form the carbon layer 18 or 18'.

As discussed above in reference to FIG. 1, the precursor 14 and/or temperature conditions may be altered to form either the substantially graphitic carbon layer 18 or the porous carbon layer 18'. When the selected carbon precursor 14 includes silane(s), it is believed that the resulting electrode material may include a layer of silicate that forms between the substrate 16 and the carbon layer 18, 18'.

The example electrode material 20''' shown in FIG. 4 includes a composite material as the substrate 16 and the porous carbon layer 18'. An example of the electrode material 20''' is shown schematically in FIG. 5. The porous carbon layer 18' is a network or matrix of carbon that has micropores and/or mesopores. This layer 18' has the substrate 16 embedded therein. In the example shown in FIG. 5, the substrate 16 includes composite nanoparticles (e.g., silicon nanoparticles, iron oxide nanoparticles, etc.). The porous carbon layer 18' enables lithium ions, electrons, and various other molecules to contact the substrate 16 at the core of the material 20'''. Additionally, the sponge-like nature of the porous carbon layer 18' reduces stress on the substrate 16 during discharging and charging of the lithium ion battery.

It is believed that the methods described in reference to FIGS. 1 and 4 may be used to apply other coatings to a variety of other substrates. Examples of other substrates that may be coated using the methods disclosed herein include silicates, aluminosilicate, or zeolites.

Figure 6A:
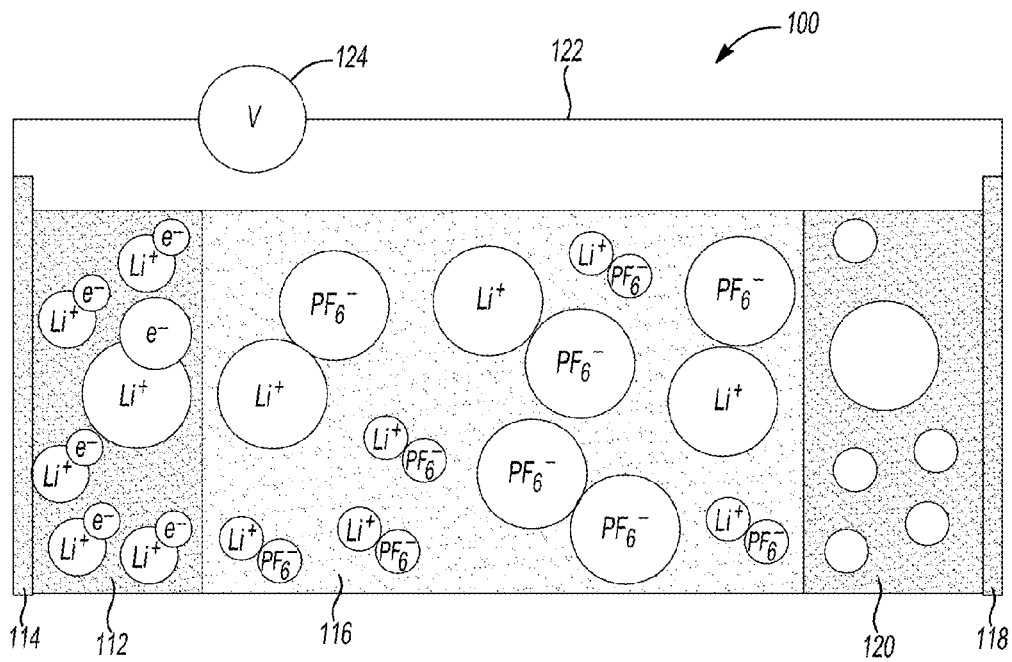
FIG. 6A is a schematic illustration of an example of a lithium ion battery including electrodes formed of examples of the lithium ion battery electrode material.

The coated substrates disclosed herein may be used as anode or cathode materials in a lithium ion battery. FIG. 6A illustrates an example of the electrode materials disclosed herein incorporated into the lithium ion battery 100.

The battery 100 includes a plurality of anode materials 20 as the anode or negative electrode 120, and a plurality of cathode materials as the cathode or positive electrode 112. A microporous polymer separator 116 is sandwiched between the two electrodes 112, 120, and an interruptible external circuit 122 connects the negative electrode 120 and the positive electrode 112. Each of the negative electrode 120, the positive electrode 112, and the microporous polymer separator 116 may be soaked in an electrolyte solution capable of conducting lithium ions.

The microporous polymer separator 116, which operates as both an electrical insulator and a mechanical support, is sandwiched between the negative electrode 120 and the positive electrode 112 to prevent physical contact between the two electrodes 120, 112 and the occurrence of a short circuit. The microporous polymer separator 116, in addition to providing a physical barrier between the two electrodes 120, 112 may also provide a minimal resistance to the internal passage of lithium ions ($Li^+$), and related anions ($PF^{6-}$), to help ensure the lithium ion battery 100 functions properly. A negative-side current collector 118 and a positive-side current collector 114 may be positioned at or near the anode 120 and the cathode 112, respectively, to collect and move free electrons to and from the external circuit 122.

The lithium ion battery 100 may support a load device 124 that can be operatively connected to the external circuit 122. The load device 124 may be powered fully or partially by the electric current passing through the external circuit 122 when the lithium ion battery 100 is discharging. While the load device 124 may be any number of known electrically-powered devices, a few specific examples of a power-consuming load device include an electric motor for a hybrid vehicle or an all-electrical vehicle, a laptop computer, a cellular phone, and a cordless power tool, to name but a few. The load device 124 may also, however, be a power-generating apparatus that charges the lithium ion battery 100 for purposes of storing energy. For instance, the tendency of windmills and solar panel displays to variably and/or intermittently generate electricity often results in a need to store surplus energy for later use.

The lithium ion battery 100 may include a wide range of other components that, while not depicted here, are nonetheless known to skilled artisans. For instance, the lithium ion battery 100 may include a casing, gaskets, terminal caps, and any other desirable components or materials that may be situated between or around the anode 120, the cathode 112, and/or the microporous polymer separator 116 for performance-related or other practical purposes. Moreover, the size and shape of the lithium ion battery 100 may vary depending on the particular application for which it is designed. Battery-powered automobiles and hand-held consumer electronic devices, for example, are two instances where the lithium ion battery 100 would most likely be designed to different size, capacity, and power-output specifications. The lithium ion battery 100 may also be connected in series and/or in parallel with other similar lithium ion batteries to produce a greater voltage output and current (if arranged in parallel) or voltage (if arranged in series) if the load device 124 so requires.

Figure 6B:
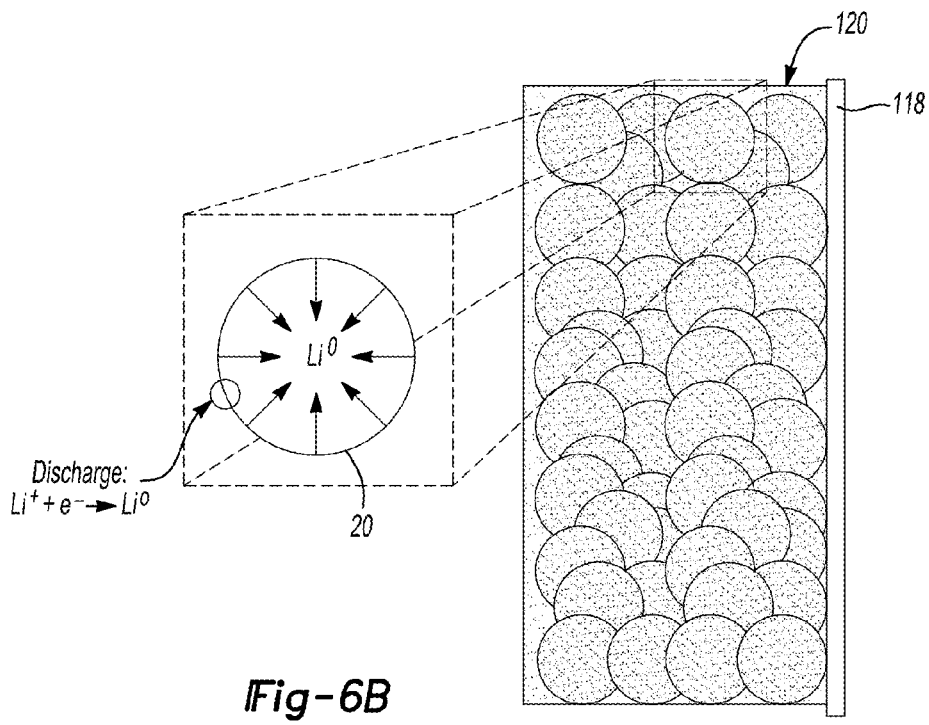
FIG. 6B is an enlarged schematic view of the anode of the lithium ion battery of FIG. 6A, with one of the particles in the anode further enlarged to show $Li^0$ in the particle.

The lithium ion battery 100 can generate a useful electric current during battery discharge by way of reversible electrochemical reactions that occur when the external circuit 122 is closed to connect the anode 120 and the cathode 112 at a time when the anode 120 contains a sufficiently higher relative quantity of intercalated lithium ($Li^0$ shown in FIG. 6B). The chemical potential difference between the cathode 120 and the anode 112 (approximately 3.7 to 4.2 volts depending on the exact chemical make-up of the electrodes 120, 112) drives electrons produced by the oxidation of intercalated lithium at the anode 120 through the external circuit 122 towards the cathode 112. Lithium ions, which are also produced at the anode 120, are concurrently carried by the electrolyte solution through the microporous polymer separator 116 and towards the cathode 112. The electrons flowing through the external circuit 122 and the lithium ions migrating across the microporous polymer separator 116 in the electrolyte solution eventually reconcile and form intercalated lithium at the cathode 112. The electric current passing through the external circuit 122 can be harnessed and directed through the load device 124 until the intercalated lithium in the anode 120 is depleted and the capacity of the lithium ion battery 100 is diminished.

The lithium ion battery 100 can be charged or re-powered at any time by applying an external power source to the lithium ion battery 100 to reverse the electrochemical reactions that occur during battery discharge. The connection of an external power source to the lithium ion battery 100 compels the otherwise non-spontaneous oxidation of intercalated lithium at the cathode 112 to produce electrons and lithium ions. The electrons, which flow back towards the anode 120 through the external circuit 122 and the lithium ions, which are carried by the electrolyte across the microporous polymer separator 116 back towards the anode 120, reunite at the anode 120 and replenish it with intercalated lithium for consumption during the next battery discharge cycle. The external power source that may be used to charge the lithium ion battery 30 may vary depending on the size, construction, and particular end-use of the lithium ion battery 30. Some suitable external power sources include, but are not limited to, an AC wall outlet and a motor vehicle alternator.

In the example shown in FIGS. 6A and 6B, the anode 120 includes a plurality of anode material particles 20, each of which has a substrate 16 coated with the carbon layer 18 or 18'. The anode material particles 20 make up a porous electrode 120 that may be about 100 μm thick. In this example, the current collector 118 may be copper.

The cathode 112 includes a plurality of cathode material particles, each of which has a substrate 16 coated with the carbon layer 18 or 18'. The cathode material particles 20 make up a porous electrode 112 that may be about 100 μm thick. In this example, the current collector 114 may be aluminum.

Any appropriate electrolyte solution that can conduct lithium ions between the anode 120 and the cathode 112 may be used in the lithium ion battery 100. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 100 as well as how to manufacture or commercially acquire them. A list of example lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and mixtures thereof. These and other similar lithium salts may be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 116 includes, or in some examples, is a membrane, and this membrane may be formed, e.g., from a polyolefin. The polyolefin may be a homopolymer (derived from a single monomer constituent) or a copolymer (derived from more than one monomer constituent), either linear or branched. If a copolymer derived from two monomer constituents is employed, the polyolefin may assume any copolymer chain arrangement including those of a block copolymer or a random copolymer. The same holds true if the polyolefin is a copolymer derived from more than two monomer constituents. In one example, the polyolefin may be polyethylene (PE), polypropylene (PP), or a blend of PE and PP.

In another example, the membrane of the microporous polymer separator 116 (which may also be referred to herein as simply the microporous polymer separator 116) may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 36 is poly(p-hydroxybenzoic acid).

In yet another example, the membrane of the microporous separator 116 may be chosen from a combination of the polyolefin (such as PE and/or PP) and one or more of the polymers for the separator 116 listed above.

The microporous polymer separator 116 may contain a single layer or a multi-layer laminate fabricated from either a dry or wet process. For example, in one example, a single layer of the polyolefin may constitute the entirety of the microporous polymer separator 116 membrane. In another example, a single layer of one or a combination of any of the polymers from which the microporous polymer separator 116 may be formed (e.g., the polyolefin and/or one or more of the other polymers listed above for the separator 116) may constitute the entirety of the separator 116. As another example, however, multiple discrete layers of similar or dissimilar polyolefins and/or polymers for the separator 116 may be assembled into the microporous polymer separator 116. In one example, a discrete layer of one or more of the polymers may be coated on a discrete layer of the polyolefin for the separator 116. Further, the polyolefin (and/or other polymer) layer, and any other optional polymer layers, may further be included in the microporous polymer separator 116 as a fibrous layer to help provide the microporous polymer separator 116 with appropriate structural and porosity characteristics. Skilled artisans will undoubtedly know and understand the many available polymers and commercial products from which the microporous polymer separator 116 may be fabricated, as well as the many manufacturing methods that may be employed to produce the microporous polymer separator 116. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

The porous carbon layer 18' and the substantially graphitic carbon layer 18 disclosed herein provide many advantages. Both types of layers 18, 18' enhance the conductivity of the underlying substrate 16. The core/shell structures that are formed provide high electronic robustness and cycling stability due to its capability to alleviate mechanical stress generated during charging/discharging.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from 10 nm to about 1 μm should be interpreted to include not only the explicitly recited limits of 10 nm to about 1 μm, but also to include individual values, such as 100 nm, 500 nm, 750 nm, etc., and sub-ranges, such as from about 50 nm to about 950 nm, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A method for forming a lithium ion battery electrode material, the method comprising:
    positioning a substrate precursor and a carbon precursor in a heating device such that the substrate precursor and the carbon precursor are carried in a direction of a gas flow through the heating device, wherein the carbon precursor is a solid or a liquid and wherein the substrate precursor is a metal oleate;
    heating the carbon precursor to a temperature above its boiling point, thereby evaporating the carbon precursor and generating a vapor of the carbon precursor, the carbon precursor being selected from the group consisting of aromatic hydrocarbons and aromatic functional groups containing silanes; and exposing the substrate precursor to the vapor and an elevated temperature that is above the boiling point of the carbon precursor under an inert gas flow flowing in the direction, thereby forming a substrate and a carbon layer on the substrate.

2. The method as defined in claim 1, further comprising synthesizing the substrate using an aerosol-assisted process.

3. The method as defined in claim 2 wherein synthesizing the substrate using the aerosol-assisted process is accomplished by:
    atomizing a solution of the substrate precursor material in a liquid to form droplets of the substrate precursor material in the liquid; and
    passing the droplets through a heating zone to convert the droplets to the substrate.

4. The method as defined in claim 3 wherein the substrate precursor material is a metal oxide precursor or a metal phosphate precursor, and wherein the liquid is a hydrocarbon, water, or an alcohol.

5. The method as defined in claim 1 wherein the carbon precursor is one of the aromatic functional groups containing silanes which are selected from the group consisting of Diphenylsilanediol, Diphenylsilane, Triethoxy(1-phenylethenyl)silane, Trimethyl(phenoxy)silane, Trimethyl(phenyl)silane, Diphenyl(silane-d$_2$), and Triphenyl(vinyl)silane).

6. The method as defined in claim 1 wherein the substrate is silicon or silicon having an oxide layer thereon, and wherein one of:
    the aromatic hydrocarbons are selected from the group consisting of benzene, naphthalene, toluene, and xylene; or
    the aromatic functional groups containing silanes are selected from the group consisting of Diphenylsilanediol, Diphenylsilane, Triethoxy(1-phenylethenyl) silane, Trimethyl(phenoxy)silane, Trimethyl(phenyl)silane, Diphenyl(silane-d$_2$), and Triphenyl(vinyl)silane).

7. The method as defined in claim 1, further comprising creating at least one pore in the substrate.

8. The method as defined in claim 1 wherein the carbon layer is porous, and wherein the method further comprises selecting process conditions for the generating and the exposing that enable the porous carbon layer to be formed.

9. The method as defined in claim 1 wherein the carbon coating is a substantially graphitic carbon layer, and wherein the method further comprises selecting process conditions for the generating and the exposing that enable the substantially graphitic carbon layer to be formed.

10. The method as defined in claim 9, further comprising depositing an artificial solid electrolyte interphase covering the substantially graphitic carbon layer.

11. A method for forming a lithium ion battery electrode material, the method comprising:
    forming a substrate precursor solution including iron oleate and a carrier liquid;
    exposing the substrate precursor solution to an atomization process, thereby generating aerosol droplets of the substrate precursor solution;
    evaporating the carrier liquid from the aerosol droplets of the substrate precursor solution, thereby forming pre-substrate composite particles including carbon and nanocrystals of Fe and $FeO_x$; and in the presence of a carbon precursor, heating the pre-substrate composite particles to at least a boiling point of the carbon precursor to evaporate the carbon precursor, thereby converting the pre-substrate composite particles to $Fe_3O_4$ substrate particles and coating the $Fe_3O_4$ substrate particles with a carbon layer.

12. The method as defined in claim 11 wherein the carbon precursor is diphenylsilanediol and wherein a silicate layer is formed between the $Fe_3O_4$ substrate particles and the carbon layer during the heating step.

13. The method as defined in claim 1 wherein the substrate precursor is iron oleate.

14. The method as defined in claim 11, further comprising creating at least one pore in the substrate.

15. The method as defined in claim 11 wherein the carbon layer is porous, and wherein the method further comprises selecting process conditions for the generating and the exposing that enable the porous carbon layer to be formed.

16. The method as defined in claim 11 wherein the carbon coating is a substantially graphitic carbon layer, and wherein the method further comprises selecting process conditions for the generating and the exposing that enable the substantially graphitic carbon layer to be formed.

17. The method as defined in claim 16, further comprising depositing an artificial solid electrolyte interphase covering the substantially graphitic carbon layer.

* * * * *